United States Patent
Keski-Valkama et al.

(10) Patent No.: US 12,450,919 B2
(45) Date of Patent: Oct. 21, 2025

(54) METHOD, APPARATUS, AND SYSTEM FOR PROVIDING MACHINE LEARNING-BASED REGISTRATION OF IMAGERY WITH DIFFERENT PERSPECTIVES

(71) Applicant: HERE Global B.V., Eindhoven (NL)

(72) Inventors: Tero Juhani Keski-Valkama, Zürich (CH); Reinhard Walter Köhn, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 468 days.

(21) Appl. No.: 17/859,745

(22) Filed: Jul. 7, 2022

(65) Prior Publication Data
US 2024/0013554 A1   Jan. 11, 2024

(51) Int. Cl.
*G06T 7/70* (2017.01)
*G06N 3/08* (2023.01)
*G06V 10/74* (2022.01)
*G06V 10/82* (2022.01)
*G06V 20/56* (2022.01)

(52) U.S. Cl.
CPC ............. *G06V 20/588* (2022.01); *G06N 3/08* (2013.01); *G06T 7/70* (2017.01); *G06V 10/761* (2022.01); *G06V 10/82* (2022.01)

(58) Field of Classification Search
CPC .... G06V 20/588; G06V 20/70; G06V 20/182; G06V 10/761; G06V 10/82; G06V 10/806; G06N 3/045; G06N 3/08; G06T 2207/10032; G06T 2207/20081; G06T 2207/20084; G06T 2207/30184; G06T 2207/30236; G06T 7/33; G06T 7/70
See application file for complete search history.

(56) References Cited

U.S. PATENT DOCUMENTS

| | | | |
|---|---|---|---|
| 2018/0144458 A1* | 5/2018 | Xu | ........................ H04N 13/271 |
| 2019/0295315 A1* | 9/2019 | Levinson | ................ G06T 17/20 |
| 2020/0098135 A1 | 3/2020 | Ganjineh et al. | |
| 2020/0167603 A1 | 5/2020 | Ung et al. | |
| 2020/0234397 A1 | 7/2020 | Holzer et al. | |

(Continued)

OTHER PUBLICATIONS

Shi et al., "Geometry-guided street-view panorama synthesis from satellite imagery", retrieved from https://arxiv.org/pdf/2103.01623.pdf, pp. 1-17.

*Primary Examiner* — Carol W Chan

(57) ABSTRACT

An approach is provided for machine learning-based registration of imagery with different perspectives. The approach, for example, involves retrieving a first training image and a second training image. The first training image depicts a geographic area from a first perspective and the second training image depicts the geographic area from a second perspective. The approach also involves initiating a labeling of one or more ground truth correspondence masks between the first training image and the second training image. The one or more ground truth correspondence masks denote an image region of the first training image that matches a corresponding image region of the second training image or vice versa. The approach further involves using the one or more ground truth correspondence masks to train a machine learning model to determine one or more predicted correspondence masks between a first input image and a second input image.

17 Claims, 13 Drawing Sheets

(56) References Cited

U.S. PATENT DOCUMENTS

| | | | |
|---|---|---|---|
| 2020/0302627 A1* | 9/2020 | Duggal | G06N 20/00 |
| 2021/0104065 A1 | 4/2021 | Hasberg et al. | |
| 2021/0125366 A1 | 4/2021 | Hasberg et al. | |
| 2022/0156886 A1* | 5/2022 | Petrangeli | G06T 3/606 |
| 2023/0135234 A1* | 5/2023 | Wang | G06V 10/774 |
| | | | 382/103 |

\* cited by examiner

METHOD, APPARATUS, AND SYSTEM FOR PROVIDING MACHINE LEARNING-BASED REGISTRATION OF IMAGERY WITH DIFFERENT PERSPECTIVES

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources (e.g., overhead/aerial cameras, street-level cameras, etc.). However, location accuracy can vary across these sources (e.g., higher accuracy from overhead imagery and lower accuracy from street-level imagery), thereby limiting their use when trying to achieve high accuracy digital map data and leading to potentially wasted image data. Accordingly, map service providers face significant technical challenges to maximize the use of all available image sources including lower accuracy sources for creating digital maps.

SOME EXAMPLE EMBODIMENTS

Therefore, there is a need for an approach for registering (e.g., determining feature or image correspondence) between different images depicting approximately the same location or geographic area to provide for localization and/or any other equivalent location-based services.

According to one embodiment, a computer-implemented method comprises retrieving a first training image and a second training image. The first training image depicts a geographic area from a first perspective and the second training image depicts the geographic area from a second perspective. The method also comprises initiating a labeling of one or more ground truth correspondence masks between the first training image and the second training image. The one or more ground truth correspondence masks denote an image region of the first training image that matches a corresponding image region of the second training image or vice versa. The method further comprises using the one or more ground truth correspondence masks to train a machine learning model to determine one or more predicted correspondence masks between a first input image and a second input image. The method further comprises providing the trained machine learning model as an output.

According to another embodiment, an apparatus comprises at least one processor, and at least one memory including computer program code for one or more computer programs, the at least one memory and the computer program code configured to, with the at least one processor, cause, at least in part, the apparatus to retrieve a first training image and a second training image. The first training image depicts a geographic area from a first perspective and the second training image depicts the geographic area from a second perspective. The apparatus is also caused to initiate a labeling of one or more ground truth correspondence masks between the first training image and the second training image. The one or more ground truth correspondence masks denote an image region of the first training image that matches a corresponding image region of the second training image or vice versa. The apparatus is further caused to use the one or more ground truth correspondence masks to train a machine learning model to determine one or more predicted correspondence masks between a first input image and a second input image. The apparatus is further caused to provide the trained machine learning model as an output.

According to another embodiment, a non-transitory computer-readable storage medium carries one or more sequences of one or more instructions which, when executed by one or more processors, cause, at least in part, an apparatus to process a first image and a second image to retrieve a first training image and a second training image. The first training image depicts a geographic area from a first perspective and the second training image depicts the geographic area from a second perspective. The apparatus is also caused to initiate a labeling of one or more ground truth correspondence masks between the first training image and the second training image. The one or more ground truth correspondence masks denote an image region of the first training image that matches a corresponding image region of the second training image or vice versa. The apparatus is further caused to use the one or more ground truth correspondence masks to train a machine learning model to determine one or more predicted correspondence masks between a first input image and a second input image. The apparatus is further caused to provide the trained machine learning model as an output.

According to another embodiment, an apparatus comprises means for retrieving a first training image and a second training image. The first training image depicts a geographic area from a first perspective and the second training image depicts the geographic area from a second perspective. The apparatus also comprises means for initiating a labeling of one or more ground truth correspondence masks between the first training image and the second training image. The one or more ground truth correspondence masks denote an image region of the first training image that matches a corresponding image region of the second training image or vice versa. The apparatus further comprises means for using the one or more ground truth correspondence masks to train a machine learning model to determine one or more predicted correspondence masks between a first input image and a second input image. The apparatus further comprises means for providing the trained machine learning model as an output.

According to one embodiment, a computer-implemented method comprises retrieving a first input image and a second input image. The first input image depicts a geographic area from a first perspective and the second input image depicts the geographic area from a second perspective. The method also comprises using a trained machine learning model to process the first input image and the second input image to determine one or more predicted correspondence masks between the first input image and the second input image. The one or more predicted correspondence masks denote an image region of the first input image that matches a corresponding image region of the second input image or vice versa. The method further comprises providing the one or more predicted correspondence masks as an output.

According to another embodiment, an apparatus comprises at least one processor, and at least one memory including computer program code for one or more computer programs, the at least one memory and the computer program code configured to, with the at least one processor, cause, at least in part, the apparatus to retrieve a first input image and a second input image. The first input image depicts a geographic area from a first perspective and the second input image depicts the geographic area from a second perspective. The apparatus is also caused to use a trained machine learning model to process the first input image and the second input image to determine one or more predicted correspondence masks between the first input image and the second input image. The one or more predicted correspondence masks denote an image region of the first input image that matches a corresponding image region of the second input image or vice versa. The apparatus is further caused to provide the one or more predicted correspondence masks as an output.

According to another embodiment, a non-transitory computer-readable storage medium carries one or more sequences of one or more instructions which, when executed by one or more processors, cause, at least in part, an apparatus to process a first image and a second image to retrieve a first input image and a second input image. The first input image depicts a geographic area from a first perspective and the second input image depicts the geographic area from a second perspective. The apparatus is also caused to use a trained machine learning model to process the first input image and the second input image to determine one or more predicted correspondence masks between the first input image and the second input image. The one or more predicted correspondence masks denote an image region of the first input image that matches a corresponding image region of the second input image or vice versa. The apparatus is further caused to provide the one or more predicted correspondence masks as an output.

According to another embodiment, an apparatus comprises means for retrieving a first input image and a second input image. The first input image depicts a geographic area from a first perspective and the second input image depicts the geographic area from a second perspective. The apparatus also comprises means for using a trained machine learning model to process the first input image and the second input image to determine one or more predicted correspondence masks between the first input image and the second input image. The one or more predicted correspondence masks denote an image region of the first input image that matches a corresponding image region of the second input image or vice versa. The apparatus further comprises means for providing the one or more predicted correspondence masks as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for location correction of image sources based on feature point correspondence are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such can also "one embodiment" is used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
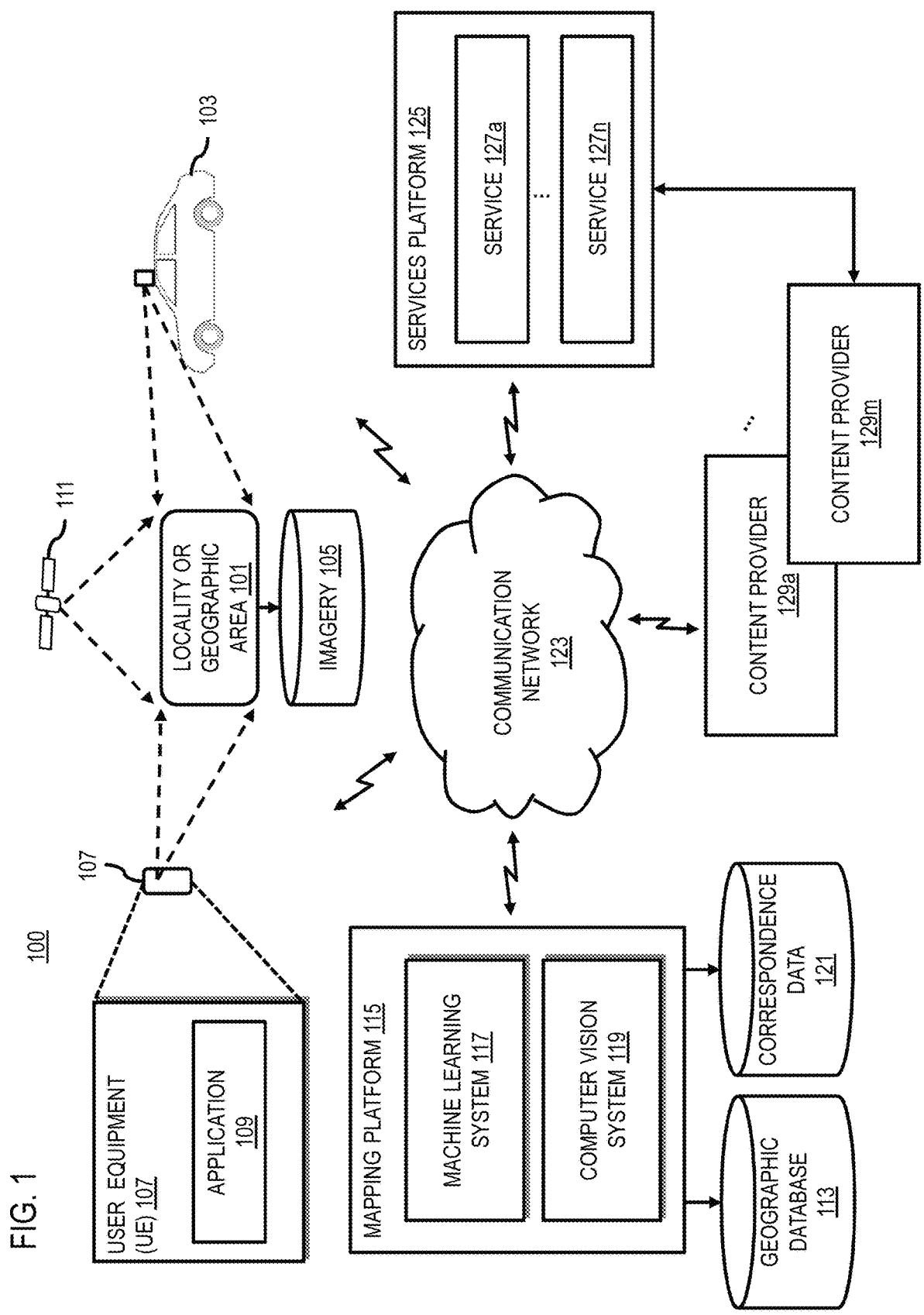
FIG. 1 is a diagram of a system capable of providing machine learning-based registration of imagery with different perspectives, according to one embodiment.

FIG. 1 is a diagram of a system 100 capable of providing machine learning-based registration of imagery with different perspectives, according to one embodiment. As used herein, the term "registration of imagery" or "image registration" refers to a process by which images that at least partially depict the same locality or geographic are aligned to a common coordinate system or otherwise matched to determine portions of each images that correspond to the same areas, features, objects, points, etc. depicted in each respective feature. By way of example, image registration can be used for any number of location-based applications including but not limited to mapless positioning.

Mapless positioning is an important use case for, e.g., autonomous vehicles, augmented reality (AR) and extended reality (XR) applications, and any other area/application where a signal of a camera is to be positioned relative to the surrounding area (e.g., a locality or geographic area 101). As shown in FIG. 1, the camera can be equipped, mounted, or otherwise associated with any platform including but not limited to a vehicle 103 (e.g., providing imagery 105 from a street level viewpoint or perspective), a user equipment (UE) device 107 (e.g., executing an application 109 to provide imagery 105 from a street level viewpoint or perspective), and/or a satellite 111 or other aerial vehicle (e.g., airplane, drone, etc.) (e.g., providing imagery 105 from an overhead perspective). Traditional solutions range from simple GPS-type positioning to improving it with Kalman filtering, inertial, vehicle speed, engine, steering and compass information, to relative visual positioning by optical flow or landmarks. For example, autonomous driving is quickly becoming a reality following advances in machine learning, computer vision, and compute power. The ability to perceive the world with an accurate semantic understanding enables vehicles 103 (e.g., an autonomous vehicle) to obey driving rules and avoid collisions.

In general, absolute positioning is the gold standard, i.e., to get the position of a vehicle 103 or UE device 107 in relation to a global reference frame such as but not limited to GNSS/GPS reference ellipsoid, or on reference overhead images or high definition map. In many cases, absolute positioning is less frequent in time than relative positioning information which can be used to approximately update absolute positioning until drift grows too large.

Different sources of raw data (e.g., imagery 105) can be exploited for positioning and/or other location-based services (e.g., mapping to generate digital map data of a geographic database 113). For example, overhead or top down sources, like satellite, aerial, and drone images, which are accurate photographs of the Earth's surface from an overhead perspective, can be used to precisely determine the location of roads, and other features on the Earth. These images help support positioning or create maps at a much larger scale but may be more limited in resolution because of the large fields of view in each overhead image relative to street-level or ground-based images.

Street-level or ground sources like cars and robots can also be exploited for positioning or to acquire an accurate model of their environment using sensing systems like cameras and running perception algorithms on the acquired data. Processing ground sources generally requires more effort and resources to do a larger scale city level collection, but the resulting images can provide for more detail or be collected more frequently than overhead images. Therefore, accurate positioning and/or mapping a more complete set of features in an area may often require using both overhead and street level image sources.

Since both overhead and street level imagery 105 are generally georeferenced (e.g., have camera positions associated with them), the geographic areas, points, map features, etc. detected from the imagery will also have associated known positions and hence can be utilized for visual positioning or other location-based services. However, the accuracy of the georeferenced positions can vary considerably. For example, in some areas, overhead sources such as satellites may be able to determine their positions more accurately than street level sources because street level sources can be more susceptible to interference issues with their location sensors (e.g., multipath interference of GNSS/GPS sensors in urban canyons) or usually have lower quality or less accurate location sensors. However, in other areas, where street level sources are collected by specialized mapping vehicles with high accuracy sensors that can control for interference or in open sky areas where there is little or no interference, the street level sources may be as accurate or in some cases more accurate than overhead sources. As a result using less accurate sources in combination with higher accuracy sources for positioning or other location-based services (e.g., map making) can result in overall less accuracy, thereby creating significant technical challenges with respect to visual positioning accuracy given image sources with varying levels of accuracy.

In summary, acquiring real time dashcam or street-level imagery and an approximate overhead, satellite or aerial imagery allows in principle matching visual features in both together which allows absolute positioning of those visible features, e.g., by the means of pixelwise absolute positioning in the overhead imagery.

However, acquiring such a mapping or correspondence between images of different perspectives (e.g., matching commonly depicted areas, features, etc. between street level and overhead images or vice versa) is technically challenging because the common landmark features in both images might be sparse, and technically difficult to automatically correlate the features because the different street level and overhead images depict the common features, areas, points, etc. from different angles, lighting, obstructions, or otherwise subject to different image quality decreasing factors.

Image feature detection can be used to find constellations of similar image features in two different images of the same region. For example, algorithms such as Scale Invariant Feature Transform (SIFT) or equivalent can be used to detect invariant, sparse descriptors in images which can sometimes be used to find matchings and alignments between features in different images, as long as the images are from similar enough angles. Algorithms such as Random Sample Consensus (RANSAC) are used to optimize correspondences between descriptors in different images of the same scene.

Figure 2:
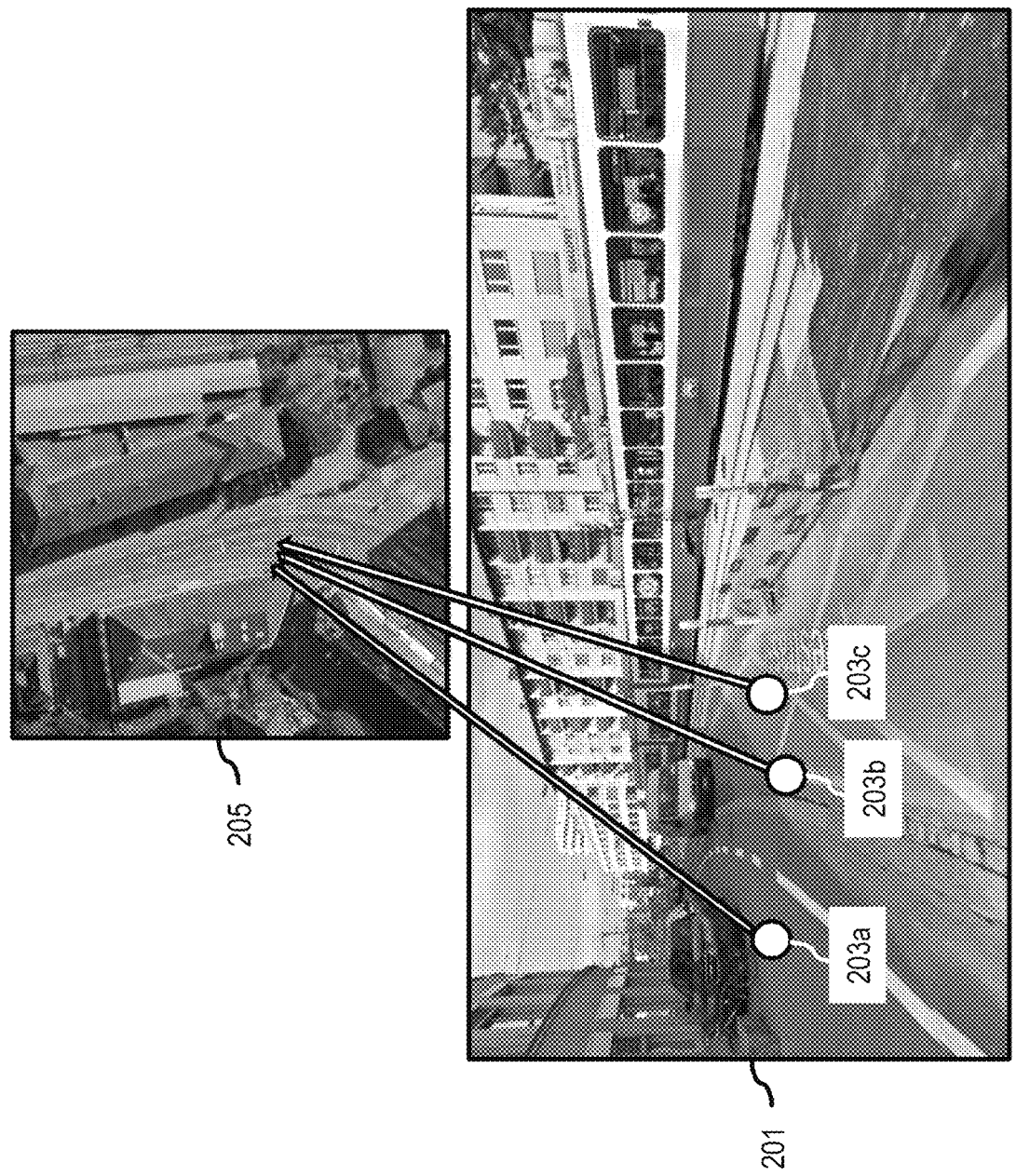
FIG. 2 is a diagram illustrating an example of registering two images based on feature correspondence, according to one embodiment.

However, radically different angles of the same area create technical challenges and difficulties because the descriptors are also transformed between different viewpoints or perspectives. Sparse descriptors can have large positional uncertainties which reduces the accuracy of their relative localization. In contrast, too dense descriptors become computationally intractable to align. FIG. 2 is a diagram illustrating an example of registering two images based on traditional feature correspondence, according to one embodiment. In the example of FIG. 2, a street level image 201 depicts map features 203a-203c at a locality/geographic area of interest. The map features 203a-203c are examples of sparse features/descriptors (e.g., numbering only three features which is below a designated number features for classification as sparse). An overhead image 205 is retrieved or otherwise obtained for the same locality and depicts the same sparse map features 203a-203c. Under this traditional approach, the map features are identified in both images 201 and 205 for alignment and registration. However, because of the sparse feature set, the accuracy and certainty of the alignment and registration can potentially be low. This, in turn, can lead to lower accuracy localization when such localization is based on the registration of the two images 201 and 205.

To address these technical challenges, the system 100 of FIG. 1 introduces a capability (e.g., vehicle a mapping platform 115) for acquiring absolute positioning by utilizing images with different viewpoints or perspectives (e.g., a local street view image and an overhead image, or equivalent) from approximately the same area. In one embodiment, instead of using traditional sparse descriptors to align two input images with different viewpoints together, the system 100 uses deep neural networks (or equivalent machine learning models) to produce an implicit mapping from image coordinates associated with a first viewpoint/perspective to image coordinates associated with a second viewpoint/perspective (e.g., street level image coordinates to overhead image coordinates) based on visual similarities and their correspondences learned by a deep neural network or equivalent machine learning model (e.g., comprising a machine learning system 117 alone or in combination with a computer vision system 119). In one embodiment, the system 100 generates correspondence masks (e.g., correspondence data 121) which indicate the pixels or areas of one image is that depicts the same features, areas, points, etc. as another image to perform image registration. To perform image registration, the system 100 can use implicit coordinate transforms between the first image and the second image for the pixels in the generate correspondence data 121.

Figure 3:
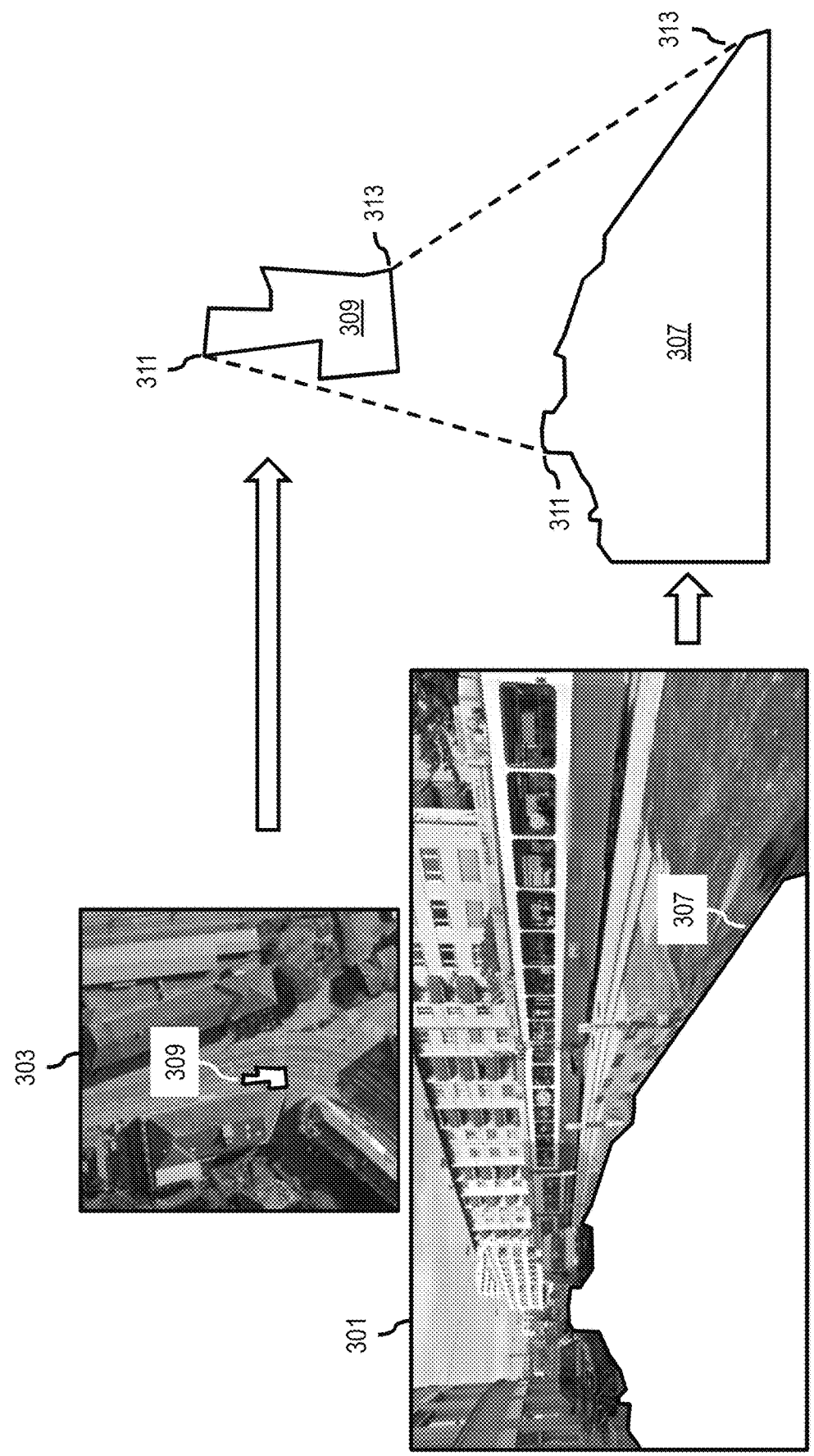
FIG. 3 is a diagram illustrating an example of registering two images based on predicted correspondence masks, according to one embodiment.

FIG. 3 is a diagram illustrating an example of registering two images based on predicted correspondence masks (e.g., correspondence data 121), according to one embodiment. In this example, a street level image 301 is captured and depicts a roadway in a geographic area of interest. An overhead image 303 that depicts at least part of the same roadway depicted in street level image 301 is retrieved. The images 301 and 303 are then processed using the machine learning system 117 (e.g., a neural network or equivalent machine learning model) to predict correspondence masks 307 and 309 according to the various embodiments described herein. The correspondence mask 307 comprises the pixels of the street level image 301 that matches (e.g., depicts the same portion of the roadway) the pixels of the correspondence mask 309 of the overhead image 309. In one embodiment, the machine learning system 117 uses visual similarities and/or related features between the matching regions of the images 307 and 309 to predict the correspondence masks 307 and 309.

In one embodiment, each of the images 301 and 303 are associated with an image space coordinates specifying positioning coordinates of pixels or groups of pixels in the respective image. In this example, the image space coordinates of the overhead image 303 is known with high accuracy because the image 303 was captured using a satellite-based imaging system whose position is known with high accuracy in a global coordinate system or frame of reference. As such, the location coordinate of each point in the correspondence mask 307 of the overhead image 303 is known with high accuracy using globally referenced coordinates. In this case, the machine learning system 117 is also trained to transform the image space coordinates of the street level image 301 to the global image space coordinates of the overhead image 303. Accordingly, the image space coordinate of the point 311 in the correspondence mask 307 of the street level image 301 can be transformed to the global and higher accuracy image space coordinate of the corresponding point 311 in the correspondence mask 309 of the overhead image 303. A similar process can be used to transform point 313 (and/or any other points) in the correspondence mask 307 to the global image space coordinates of the correspondence mask 309.

In other words, in an embodiment where one image is a street-level image with less accurate positioning coordinates and the other image is an overhead image with more accurate or globally referenced coordinates, location points in the street-level image can be localized in global coordinates of the corresponding overhead image in such a way can be used to infer the position of the camera, and/or the position of the vehicle 103, UE 107, and/or aerial vehicle 111 itself (e.g., on which the camera is mounted) using camera geometry transformations. In other words, the image coordinate space of one image (e.g., image coordinates local to a street level image) can be transform to the image coordinate of another image (e.g., global image coordinates of an overhead image) for camera and/or vehicle localization.

Compared to GNSS/GPS or other similar positioning technologies, visual positioning according to the various embodiments described herein can be done in a faster time resolution and can be more accurate and robust to certain kinds of errors. Compared to descriptor based image registration techniques, registrations produced by neural networks or equivalent machine learning models can be more dense and so more accurate. In one embodiment, neural or machine learning-based image registration can utilize learned domain-specific knowledge about visually recognized objects and their relations. The neural or machine learning-based image registration models (e.g., the machine learning system 117 as discussed according to the various embodiments described herein) can be used to derive absolute positioning (e.g., positioning relative to a global frame of reference) for vehicles or devices which would otherwise need to rely on relative positioning only (e.g., positioning relative to a local frame of reference such as relative to a camera position without knowing the camera position in a global frame of reference).

In one embodiment, the correspondence data 121 (e.g., correspondence masks and/or image space coordinate transformations) that is generated by the system 100 can be used for any type of location-based applications and/or services. For example, the correspondence data 121 can be transmitted or otherwise made accessible over a communication network 123 to a services platform 125 comprising one or more services 127a-127n (also collectively referred to as services 127), one or more content providers 129a-129m (also collectively referred to as content providers 129), and/or equivalent. including but not limited to:

Matching street level imagery to satellite or overhead images for an automated map data creation pipeline (e.g., to automatically process imagery 105 to generate map data of the geographic database 113);

Using street level imagery (e.g., of UEs 107) for localization in pedestrian navigation to support accurate positions required for AR navigation or equivalent applications;

Autonomous car localization from camera images;

Visual positioning; and/or

Any other application which can take advantage from matching imagery 105 with different perspectives (e.g., street level images to satellite or any other different of any two image pairs) or which uses outdoor visual positioning.

Figure 4:
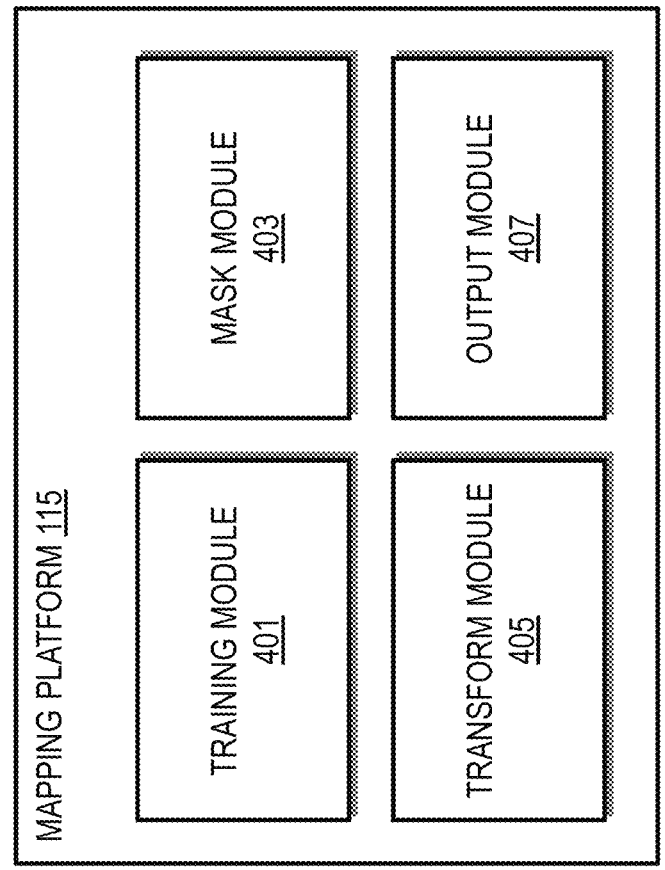
FIG. 4 is a diagram of components of a mapping platform capable of providing machine learning-based registration of imagery with different perspectives, according to one embodiment.

FIG. 4 is a diagram of components of a mapping platform 115 capable of providing machine learning-based registration of imagery with different perspectives, according to one embodiment. In one embodiment, as shown in FIG. 4, the mapping platform 115 includes one or more components for providing machine learning-based registration of imagery with different perspectives, according to the various embodiments described herein. It is contemplated that the functions of these components may be combined or performed by other components of equivalent functionality. In this embodiment, the mapping platform 115 includes a training module 401, a mask module 403, a transform module 405, and an output module 407. The above presented modules and components of the mapping platform 115 can be implemented in hardware, firmware, software, or a combination thereof. Though shown as a separate entity in FIG. 1, it is contemplated that the mapping platform 115 may be implemented as a module of any other component of the system 100 (e.g., a component of the services platform 125, services 127, vehicle 103, UE 107, application 109 executing on the UE 107, etc.). In another embodiment, one or more of the modules 401-407 may be implemented as a cloud based service, local service, native application, or combination thereof. The functions of the mapping platform 115 and the modules 401-407 are discussed with respect to figures below.

Figure 5:
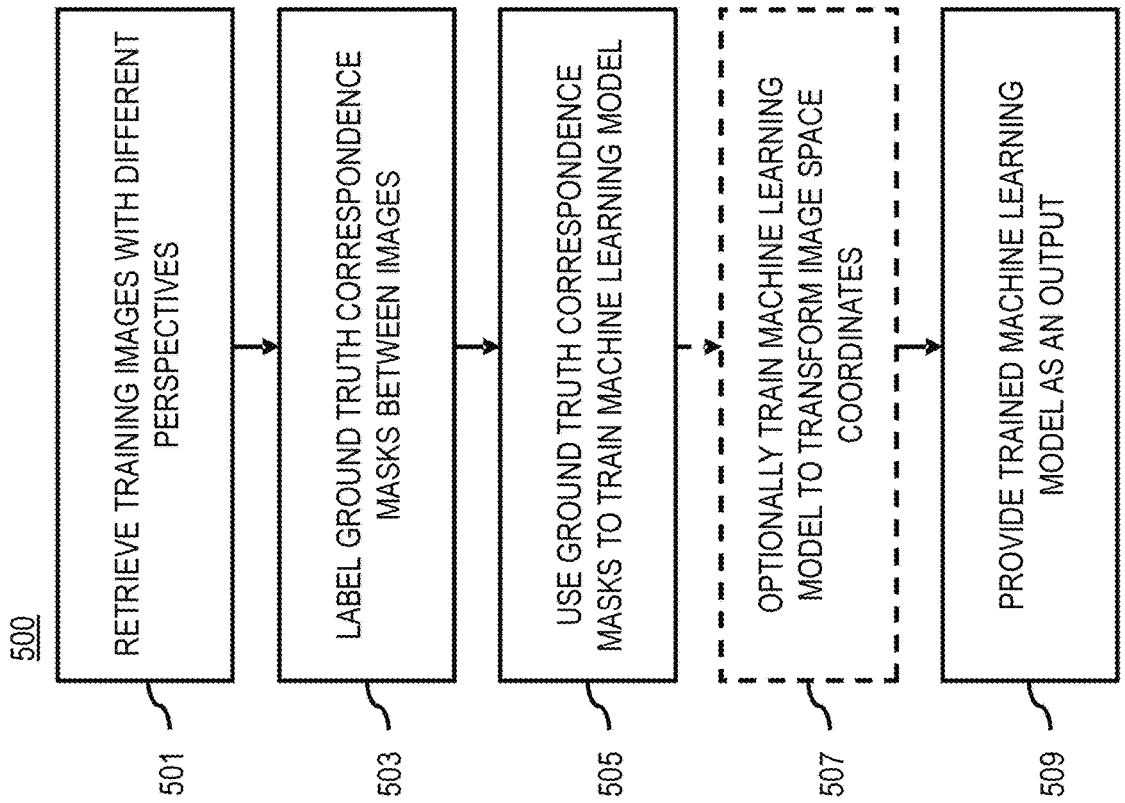
FIG. 5 is a flowchart of a process for training a machine learning model/system for registering imagery with different perspectives, according to one embodiment.
Figure 12:
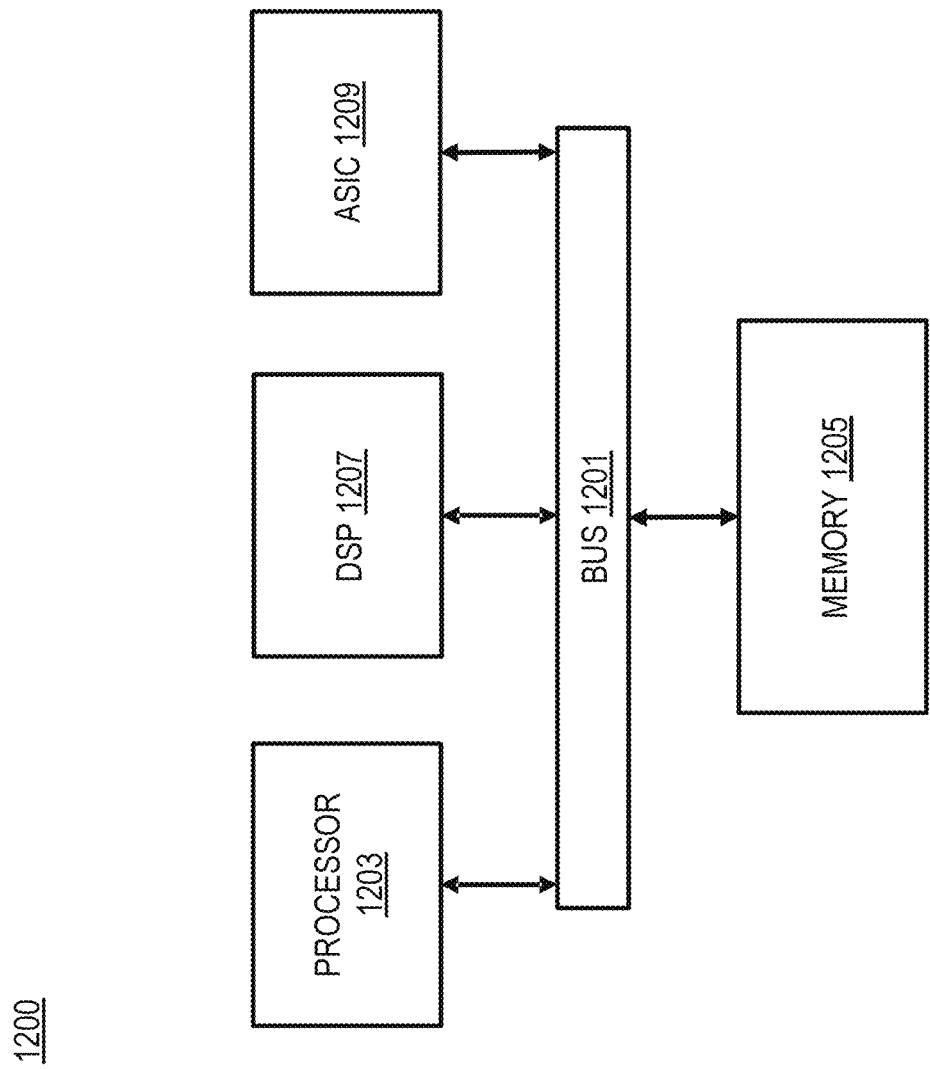
FIG. 12 is a diagram of a chip set that can be used to implement an embodiment.

FIG. 5 is a flowchart of a process 500 for training a machine learning model/system 117 for registering imagery 105 with different perspectives, according to one embodiment. More specifically, the embodiments of the process 500 can be used to train a machine learning model or system 117 to predict correspondence data 121 (e.g., correspondence masks, image space coordinate transformations). In various embodiments, the mapping platform 115 and/or any of its modules 401-407 may perform one or more portions of the process 500 and may be implemented in, for instance, a chip set including a processor and a memory as shown in FIG. 12. As such, the mapping platform 115 and/or the modules 401-407 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the process 500 trains an image-based deep learning system (e.g., machine learning system 117 which can be given two input images, it produces or otherwise predicts a correspondence mask for both input images which denote which image regions that match the corresponding other image (e.g., that depict the same locality/geographic area or portion thereof from a different perspectives). Another function of the same deep neural network (e.g., machine learning system 117) that shares parameter weights with the first correspondence mask function takes in an image space coordinate in one image where the previously mentioned correspondence mask is on and produces a corresponding image space coordinate in the other image. By way of example, this learned function realizes a general implicit transformation from one image domain to another.

In step 501, the training module 401 retrieves or otherwise generates a first training image and a second training image (e.g., a training image pair). The first training image depicts a geographic area from a first perspective and the second training image depicts the geographic area from a second perspective. Although the various embodiments described herein are discussed with respect to the one perspective/viewpoint being a street level perspective (e.g., a camera with less than an elevation angle from the ground plane or surface) and the other perspective/viewpoint being an overhead perspective (e.g., a camera within an angular elevation range pointing down from an orthogonal angle to the ground plane or surface), it is contemplated that the first perspective/viewpoint and the second perspective/viewpoint can be any viewpoint that is different from one another (e.g., different in position and/or elevation of the camera). For example, in an embodiment utilizing street level and overhead imagery 105, the machine learning system 117 is trained by giving it pairs of approximately matching images where one is on street level, and another is an overhead image of the same area. Approximately matching refers to one image depicting at least a portion of a locality/geographic area depicted in the other image.

In one embodiment, multiple different loss functions and/or supervision schemes can be used alternatively or together to train the machine learning system 117. One example scheme is based on supervised learning. For example, in supervised learning, the machine learning system 117 can incorporate a learning model (e.g., a logistic regression model, Random Forest model, and/or any equivalent model) to train the machine learning system 117 to make predictions (e.g., outputs) from input features or signals. During training, the machine learning system 117 can use the learner module to feed feature sets from a training data set (e.g., the retrieved or generated image pairs with different perspectives) into the machine learning model to compute a predicted matching feature using an initial set of model parameters. The learner module then compares the predicted matching probability and the predicted feature to ground truth data in the training data set for each observation (e.g., each image pair) used for training. The learner module then computes an accuracy of the predictions (e.g., via a loss function) for the initial set of model parameters. If the accuracy or level of performance does not meet a threshold or configured level, the learner module incrementally adjusts the model parameters until the model generates predictions at a desired or configured level of accuracy with respect to the annotated labels in the training data (e.g., the ground truth data). In other words, a "trained" machine learning model or system 117 has model parameters adjusted to make accurate predictions (e.g., predicted correspondence data 121) with respect to the training data set. In the case of a neural network, the model paraments can include, but are not limited to, the coefficients or weights assigned to each connection between neurons in the layers of the neural network.

It is contemplated that the training module 401 can use any process to generate training data from the retrieved or generated image pairs. The image pairs can be imagery 105 that has been captured by cameras (e.g., equipped on vehicles 103, UEs 107, satellites 111, other aerial vehicles, etc.) from different viewpoints. For example, in step 503, the training module 401 can initiate the labeling or annotation of the ground truth correspondence masks between two images used as a supervised ground truth. In other words, the training module initiates a labeling of one or more ground truth correspondence masks between the first training image and the second training image, wherein the one or more ground truth correspondence masks denote an image region of the first training image that matches a corresponding image region of the second training image or vice versa. The training module 401 can then use the one or more ground truth correspondence masks to train a machine learning model to determine one or more predicted correspondence masks between a first input image and a second input image (step 505). This labeling or annotation can be performed manually by presenting human annotators with training images to identify and delineate the ground truth correspondence masks in each training image pair (e.g., as illustrated in FIG. 3). The labeled ground truth correspondence masks can then be provided as ground truth training data.

Figure 6:
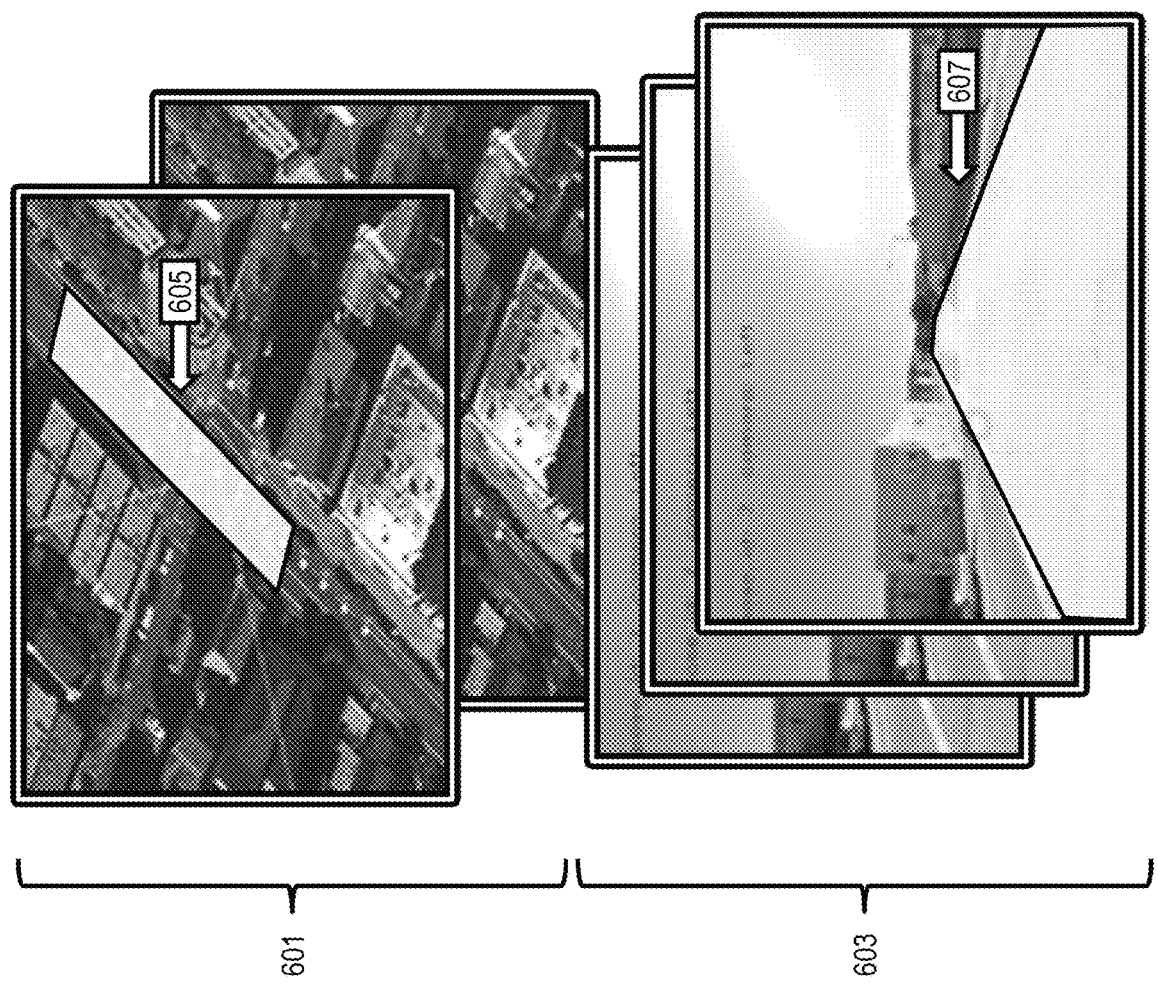
FIG. 6 is a diagram illustrating example image data depicting the same locality/geographic area from different perspectives, according to one embodiment.

FIG. 6 is a diagram illustrating example image data depicting the same locality/geographic area from different perspectives, according to one embodiment. In this example, the training module 401 retrieves or generates a set of overhead images 601 from a first source (e.g., an aerial source such as a satellite 111), and a set of street level images 603 from a second source (e.g., a street level source such as a camera mounted on a vehicle 103 or a UE 107). The overhead images 601 and street level images 603 depict at least a part of the same locality, geographic area, or map from different respective perspectives. By way of example, overhead imagery refers to images or image data that are captured from a top-down or aerial perspective so that the camera is pointed down towards the area of interest from an overhead height. Street level imagery refers to images or image data captured while the camera is located at street level or mounted on a vehicle 103, UE 107, or system that is located at street level with the camera pointed towards the feature or object being captured. As shown, ground truth correspondence mask 605 can be labeled in overhead images 601 and correspondence mask 607 in street level images 603 to identify the image pixels or regions that depict the same locality.

In one embodiment, in addition to or instead of the real imagery 105, the training module 401 can generate image pairs with different perspectives through simulation and photorealistic 3D rendering of cityscapes. For example, the geographic database 113 can include 3D models of map features or objects along with their properties, locations, arrangements, composition, etc. The training module 401 can then select the locality or geographic area to render in the simulated images along with corresponding map features using any known photorealistic rendering engine (e.g., Unreal 5 engine or equivalent). In this way, the training module 401 can get direct correspondence mask ground truth by specifying the areas that match between the two images simulated from different perspectives.

In one embodiment, the training module 401 can use image texture similarity metrics as a loss function and/or as part of another learning scheme (e.g., reinforcement learning). For example, the textures similarity metric can be computed by projecting the image texture of the correspondence mask from an overhead image to the estimated ground plane of the correspondence mask in the street-level view or projecting the ground plane from street level image to overhead image. The similarity of the projected images relative to the respective original image can be used to score the projections.

Figure 7:
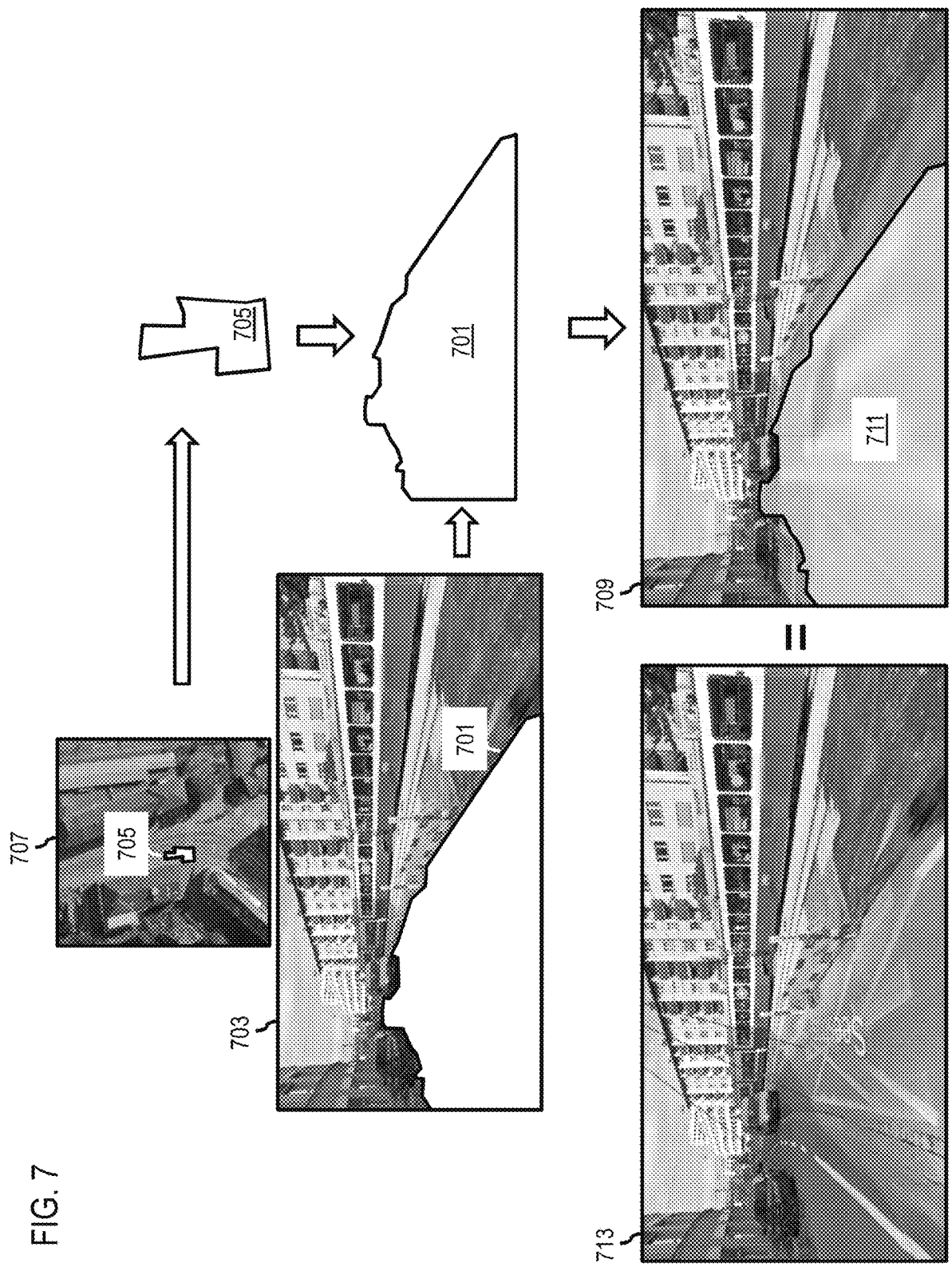
FIG. 7 is a diagram illustrating an example of using texture projection as a loss function for training a machine learning model/system for registering imagery with different perspectives, according to one embodiment.

FIG. 7 is a diagram illustrating an example of using texture projection as a loss function for training a machine learning model/system for registering imagery with different perspectives, according to one embodiment. In this example, a correspondence mask 701 is predicted for street level image 703 and a correspondence mask 705 is predicted for the paired overhead image 707. The image texture of the correspondence mask 705 of the overhead image 707 is projected into the ground plane of the correspondence mask 701 of the street level image 703 to generate image 709 with the overhead image texture 711 replacing the portion of the image delineated by the correspondence mask 701. This generated image 709 is then compared to the original street level image 713 (e.g., with the original street level image texture in the correspondence mask 701 to determine the similarity of the two images (e.g., in terms of optical pixel values and/or equivalent image characteristics). This similarity can then be used as the image texture similarity metric. Higher similarities will result in higher reinforcement scores or lower loss, and lower similarities will result in lower reinforcement scores or higher loss for purposes of training the machine learning system 117.

In one embodiment, instead of direct optical pixel values, image segmentation per-pixel labels can be used. For example, two-way projected images can be aligned using existing image registration methods. In two aligned, ground-plane projected and optionally image segmentation labeled images, the approximate ground truth for matching correspondence mask can be produced by local similarity scores and projected back to the other coordinate system.

In one embodiment, a machine learning model or system 117 which is trained to find correspondence mask (e.g., as described in the embodiments above) between two image views (also referred to as a "mask-deriving model") can be augmented by extra convolutional, attentional and/or dense layers which attend to the given input image coordinate locality in the mask-deriving model internal activations/embeddings for image space coordinates where the matching mask is set. These augmented parts of the same model form a deep neural network function which is additionally conditioned by the given image space coordinate and produce the coordinate for that point in the corresponding other image. In one embodiment, this function is only defined for points which the mask estimation network designates as shared image regions.

By way of example, this other function (e.g., image space coordinate transformation) of the machine learning model (e.g., same neural network) can be trained by data such as but not limited to:
- Manually labeled as having point correspondence image space coordinates for two images for some set of points like in FIG. 2 above;
- GPS-derived absolute location for a street-level camera coupled with LiDAR or pixel-wise depth estimation models to get ground truth relative locations for pixels of the street-level image, which can be projected to absolute pixel coordinates in the overhead image, which can be used as ground truth; and/or
- Simulation and photorealistic 3D rendering of cityscapes allows getting direct correspondence ground truth.

In other words, in optional step 507, the training module selects a first training image and second training image for training the machine learning system 117 to perform image space coordinate transformation. For example, the first training image is associated with a first set of ground truth image space coordinates and the second training image is associated with a second set of ground truth image space coordinates corresponding to the one or more ground truth correspondence masks. The training module 401 then uses the first set of ground truth image space coordinates and the second set of ground truth image space coordinates to further train the machine learning model to transform a first image space coordinate of the first input image to a second image space coordinate of the second image space coordinate of the second input image or vice versa. The trained machine learning model that is trained to determine to one or more predicted correspondence masks is augmented with at least one extra convolutional layer, at least one extra attentional layer, at least one extra dense layer, or a combination thereof which attend to the image coordinate locality of the first input image, the second input image, or a combination thereof.

In one embodiment, the machine learning model or system 117 (e.g., deep neural network structure) for the mask-deriving model and as augmented by the extra implicit coordinate transformation model together forming the registration model is constrained by the conditioning inputs, required outputs, and functions the network needs to implement between the two. In one embodiment, the inputs are as follows:

- Image from a first perspective (e.g., street-level image);
- Image from a second perspective (e.g., overhead image);
- Coordinate in the first perspective image space (e.g., street-level image space); and
- Coordinate in the second perspective image space (e.g., overhead image space).

The outputs of the trained machine learning model or system 117 are as follows (e.g., comprising correspondence data 121):
- Correspondence mask for the first input image (e.g., street-level image) designating which pixels/regions in the first input image have a correspondence in the second input image (e.g., overhead image);
- Correspondence mask for the second input image (e.g., overhead image) designating which pixels/regions in the second input image have a correspondence in the first input image (e.g., street-level image);
- Coordinate in the second input image (e.g., overhead image); and
- Coordinate in the first input image (e.g., street level image).

In one embodiment, the functions implemented by the trained machine learning model or system 117 include but are not limited to:
- PRODUCE_CORRESPONDENCE_MASK_FOR_BOTH_IMAGES(street-level image, overhead image);
- TRANSFORM_COORDINATE_TO_OVERHEAD (street-level image space coordinate, street-level image, overhead image); and/or
- TRANSFORM_COORDINATE_TO_STREET_LEVEL (overhead image space coordinate, street-level image, overhead image).

In one embodiment, the above functions share parts of the parameters/weights and structure of the trained machine learning model or system 117 (e.g., deep neural network). For example, the deep neural network in between the inputs and the outputs is composed out of image domain deep neural network elements including but not limited to convolutional layers, attentional layers, dense layers, and general pre-trained image processing backbones.

Figure 8:
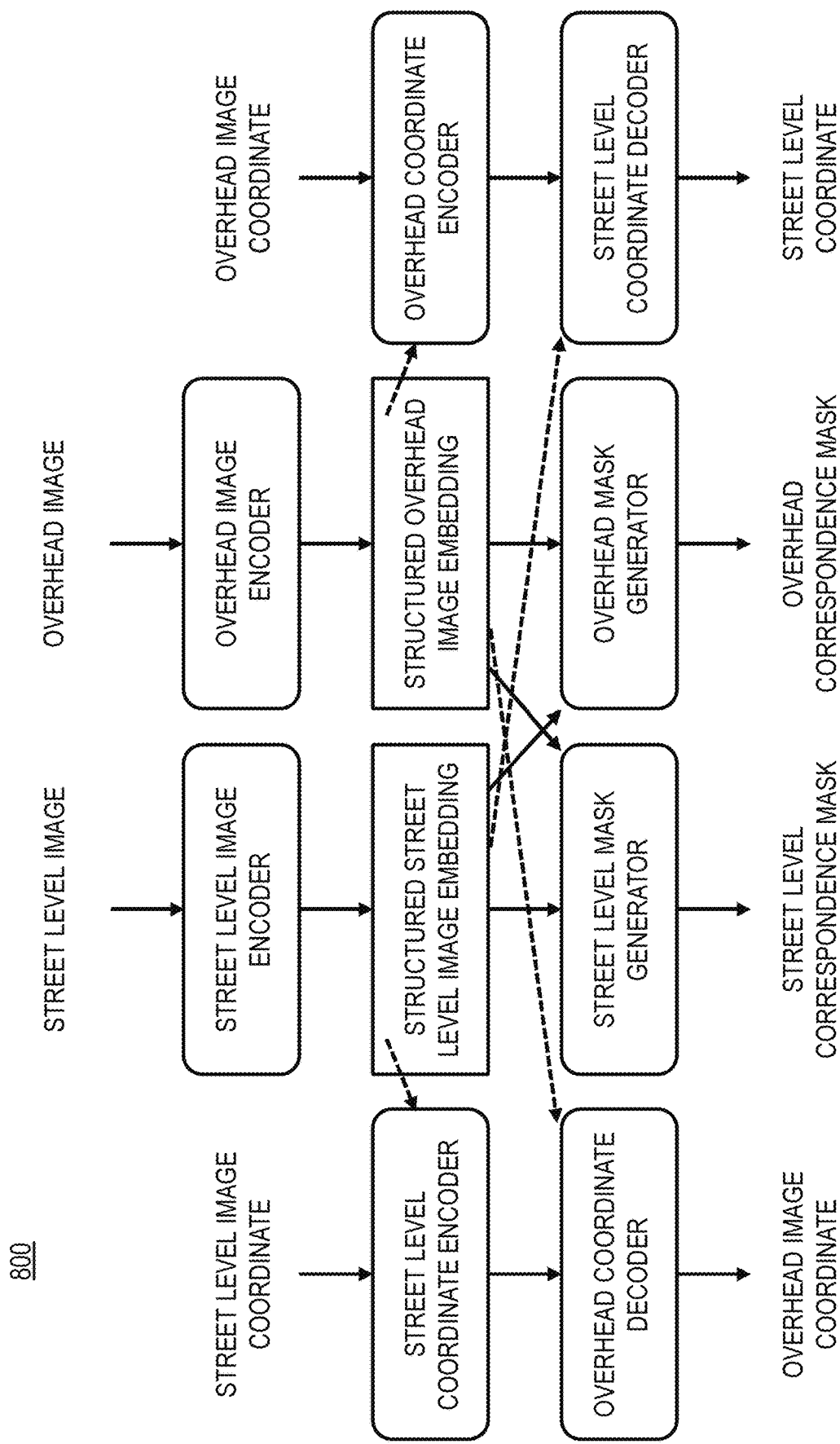
FIG. 8 is a diagram of an example machine learning architecture for registering imagery with different perspectives, according to one embodiment.

FIG. 8 is a diagram of an example machine learning architecture 800 for registering imagery with different perspectives, according to one embodiment. As shown, the machine learning architecture 800 has four inputs (e.g., street level image coordinate, street level image, overhead image, and overhead image coordinate) that are processed through architecture 800 to generate four corresponding outputs (e.g., overhead image coordinate, street level correspondence mask, overhead correspondence mask, and street level coordinate). Each of the illustrate network elements (e.g., street level coordinate encoder, overhead coordinate decoder, street level image encoder, structure street level image embedding, street level mask generator, overhead image encoder, structured overhead image embedding, overhead mask generator, overhead coordinate encoder, and street level coordinate decoder) have interdependencies. The dashed arrows denote attentional dependency, and the solid arrows denote direct dependency. It is noted that the architecture 800 is provided by way of illustration and not as a limitation. It is contemplated that addition neural network elements may be added or illustrated elements may be deleted or combined with other elements.

In step 509, the output module 407 provides the trained machine learning model or system 117 as an output. As discussed above, the output can be used for any location-based service that can used machine learning-based image registration according to the embodiments described herein.

In one embodiment, the output can be used instantiate an instance of the trained machine learning model or system 117 in the mapping platform 115 and/or any other component of the system 100 including but not limited to edge devices (e.g., vehicles 103, UEs 107, etc.) and/or external or third party services or application include but not limited to the services platform 125, services 127, and/or content providers 129.

Figure 9:
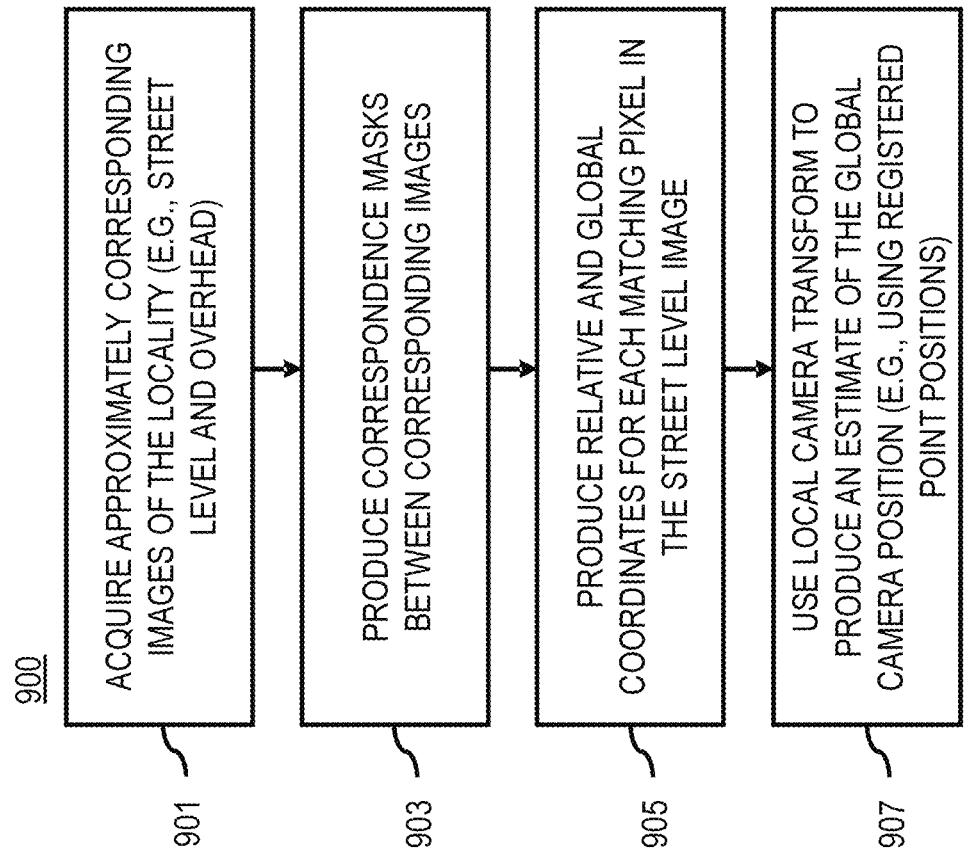
FIG. 9 is a flowchart of a process for using a trained machine learning model/system for registering imagery with different perspectives, according to one embodiment.

FIG. 9 is a flowchart of a process 900 for using a trained machine learning model/system for registering imagery with different perspectives, according to one embodiment. In various embodiments, the mapping platform 115 and/or any of its modules 401-407 may perform one or more portions of the process 900 and may be implemented in, for instance, a chip set including a processor and a memory as shown in FIG. 12. As such, the mapping platform 115 and/or the modules 401-407 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

The various embodiments of the process 900 are discussed with respect to using a machine learning system 117 that is been trained to predict correspondence data 121 for image pairs comprising a street level image and an overhead image. However, it is noted that street level and overhead image pairs are provided by way of illustration and not as limitations. It is contemplated that the various embodiments described herein can be used with image pairs captured from any perspective or viewpoint.

In one embodiment, when the trained machine learning model or system 117 is used, it is fed real street-level images and approximately corresponding overhead images (step 901). For example, street level images can be captured by a vehicle 103. Then, the mapping platform 115 can query an imagery database (e.g., imagery 105) for overhead images that are taken within a designated proximity of the location of the street level database and/or whose camera pose indicates that there is at least some overlap of the depicted locality in the images. In other words, the mapping platform 115 can retrieve a first input image and a second input image, wherein the first input image depicts a geographic area from a first perspective and the second input image depicts the geographic area from a second perspective.

In step 903, the mask module 403 uses a trained machine learning model to process the first input image and the second input image to determine one or more predicted correspondence masks between the first input image and the second input image, wherein the one or more predicted correspondence masks denote an image region of the first input image that matches a corresponding image region of the second input image or vice versa. The predicted correspondence masks can be provided as an output. For example, each mask pixel or image region produced by the mask-deriving model is queried by the registration model and any general image pixel-wise depth estimation model to produce a large number of relatively positioned points for which there are corresponding points in the overhead image.

In step 905, the transform module 405 can also use the trained machine learning model or system 117 to produce relative and global coordinates for each matching pixel in the street level image. For example, in one embodiment, the first input image (e.g., street level image) is associated with a first image space coordinate and the second input image (e.g., overhead image) is associated with a second image space coordinate corresponding to the one or more predicted correspondence masks, and wherein the trained machine learning model is further trained to transform the first image space coordinate to the second image space coordinate or vice versa.

In one embodiment, the first image space coordinate is specified using local coordinate frame of reference and the second image space coordinate is specified using a global coordinate frame of reference. The transform module 405 can then use the trained machine learning model or system 107 to localize the first image space coordinate in the global coordinate frame of reference. For example, the overhead image point coordinates are transformed to global absolute coordinate system, outliers are filtered out and the high quality points which remain are used along with their relative locations to the camera and their absolute locations derived by the registration model and overhead image pixel positioning to produce an absolute position estimate for the camera. In other words, the transform module 405 can use the localized first image space coordinate to compute a camera position of a camera capturing the first input image, a vehicle position of a vehicle on which the camera is mounted, or a combination thereof.

In step 907, by knowing the camera model or pose (e.g., camera position, mount axis, pointing direction, field of view, focal length, etc., the pixel locations comprising the correspondence mask of the input images (e.g., the street level image) can be translated to a globally referenced coordinates (e.g., expressed a geocoordinates comprising <latitude, longitude, elevation>). In other words, the known geolocation of the camera (e.g., camera latitude, longitude, elevation) can be used to translate the pixel location of points in the correspondence mask in the image to real-world coordinates. Therefore, the accuracy of the location of the camera directly determines the accuracy of the location of the of the correspondence mask points or features. In general, the location of the camera is generally determined using location sensors of the system or component on which the camera is mounted (e.g., vehicle 103, UE 107, satellite 111). This variability in camera pose or camera model accuracy, in turn, can result in the images from each source having different location accuracy. For example, in urban canyon areas with multipath interference issues, overhead may have higher location accuracy or fidelity than street level images because the satellites 111 used to capture the top down images 601 would not suffer from the multipath interference affecting the ground-based positioning receivers. Therefore, in one embodiment, the globally referenced (e.g., with respect to global frame of reference or coordinate system) can be used to transform the image space coordinates of the street level images that generally are less accurate or may not be expressed in a global frame of reference.

In other words, when a first input image has a first image space coordinate specified using a local coordinate frame of reference and a second input image has a second image space coordinate that is specified using a global frame of reference, the mapping platform 115 can use the trained machine learning model or system 117 to localize the first image space coordinate in the global coordinate frame of reference. Then, the mapping platform 115 can use the localized first image space coordinate to compute a camera position of a camera capturing the first input image, a vehicle position of a vehicle on which the camera is mounted, or a combination thereof. For example, the mapping platform 115 can use a geometric process to triangulate the camera position from registered point positions in the street level camera to determine the street level camera position with respect to the global coordinate system. Because the camera is generally mounted to a vehicle 103, UE 107, or other device, the determine camera position can be used to represent the position of the vehicle 103, UE 107, etc. for localization.

In general, a localization accuracy of around 10 cm is needed for safe driving (e.g., autonomous driving) in many areas. One way to achieve this level of accuracy is to use visual odometry, in which features are detected from imagery. These features can then be matched to a database of known feature locations to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., map features based on intersection features such as lane markings, lane lines, etc.) can provide better and more accurate localization.

Returning to FIG. 1, as shown, the system 100 includes the mapping platform 115 which incorporates the machine learning system 117 and computer vision system 119 configured to use machine learning to provide image registration according to the various embodiments described herein. For example, with respect to autonomous, navigation, mapping, and/or other similar applications, the computer vision system 119 can capture imagery 105 for processing. In one embodiment, the machine learning system 117 includes a neural network or other machine learning model to make predictions (e.g., predict correspondence data 121). For example, when the input to the machine learning model are images used in the embodiments described herein, the output can include correspondence masks and/or image space coordinate transformations. In one embodiment, the neural network of the machine learning system 117 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective grid cells.

In one embodiment, the machine learning system 117 and/or the computer vision system 119 also have connectivity or access over a communication network 123 to a geographic database 113 which stores the data generated or otherwise used according to the embodiments described herein. In one embodiment, the machine learning system 117 and/or computer vision system 119 have connectivity over a communication network 123 to the services platform 125 that provides one or more services 127. By way of example, the services 127 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 127 uses the output of the mapping platform 115 (e.g., correspondence data 121) to localize the vehicle 103 or UE 107 (e.g., a portable navigation device, smartphone, portable computer, tablet, etc.) and/or provide services 127 such as navigation, mapping, other location-based services, etc.

In one embodiment, the mapping platform 115 may be a platform with multiple interconnected components. The mapping platform 115 may include multiple servers, intelligent networking devices, computing devices, components and corresponding software for providing parametric representations of lane lines. In addition, it is noted that the mapping platform 115 may be a separate entity of the system 100, a part of the one or more services 127, a part of the services platform 125, or included within the UE 107 and/or vehicle 103.

In one embodiment, content providers 129 may provide content or data (e.g., imagery 105, geographic data, mapped features, etc.) to the geographic database 113, the machine learning system 117, the computer vision system 119, the services platform 125, the services 127, the UE 107, the vehicle 103, and/or an application 109 executing on the UE 107. The content provided may be any type of content, such as map content, textual content, audio content, video content, image content, etc. In one embodiment, the content providers 129 may provide content that may aid in machine learning-based registration of imagery with different perspectives. In one embodiment, the content providers 129 may also store content associated with the geographic database 113, mapping platform 115, machine learning system 117, computer vision system 119, services platform 125, services 127, UE 107, and/or vehicle 103. In another embodiment, the content providers 129 may manage access to a central repository of data, and offer a consistent, standard interface to data, such as a repository of the geographic database 113.

In one embodiment, the UE 107 and/or vehicle 103 may execute a software application 109 to capture image data or other observation data for image registration according the embodiments described herein. By way of example, the application 109 may also be any type of application that is executable on the UE 107 and/or vehicle 103, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 115 and perform one or more functions associated with location correction of sources based on feature correspondence alone or in combination with the machine learning system 117.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 103 or be a component part of the vehicle 103.

In one embodiment, the UE 107 and/or vehicle 103 are configured with various sensors for generating or collecting environmental image data (e.g., for processing by the mapping platform 115), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 115, machine learning system 117, computer vision system 119, services platform 125, services 127, UE 107, vehicle 103, and/or content providers 129 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
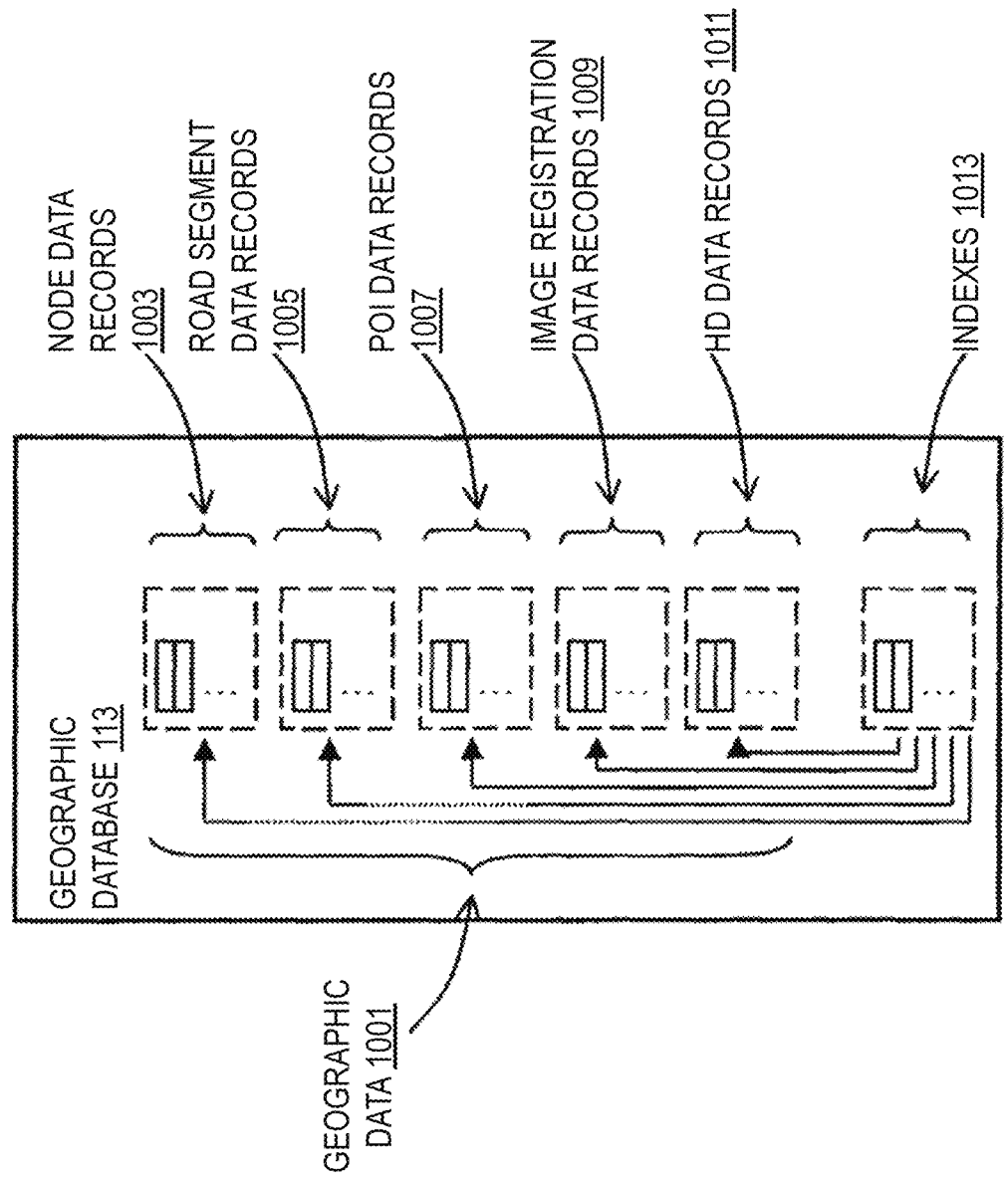
FIG. 10 is a diagram of a geographic database, according to one embodiment.

FIG. 10 is a diagram of a geographic database, according to one embodiment. In one embodiment, the geographic database 113 includes geographic data 1001 used for (or configured to be compiled to be used for) mapping and/or navigation-related services, such as for video odometry based on the mapped features (e.g., lane lines, road markings, signs, etc.). In one embodiment, the geographic database 113 includes high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 1003, road segment or link data records 1005, POI data records 1007, image registration data records 1009, HD mapping data records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 113. In one embodiment, the indexes 1013 may be used to quickly locate data without having to search every row in the geographic database 113 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (e.g., intersections) corresponding to the respective links or segments of the road segment data records 1005. The road link data records 1005 and the node data records 1003 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1007. The geographic database 113 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 113 can also include image registration data records 1009 for storing the correspondence masks, image space coordinate transformations, as well as other related data used according to the various embodiments described herein. By way of example, the feature correspondence data records 1009 can be associated with one or more of the node records 1003, road segment records 1005, and/or POI data records 1007 to support localization or visual odometry based on the features stored therein and the corresponding estimated quality of the features. In this way, the records 1009 can also be associated with or used to classify the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1011 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 129 in association with the services platform 125 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 107) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing machine learning-based registration of imagery with different perspectives may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 11:
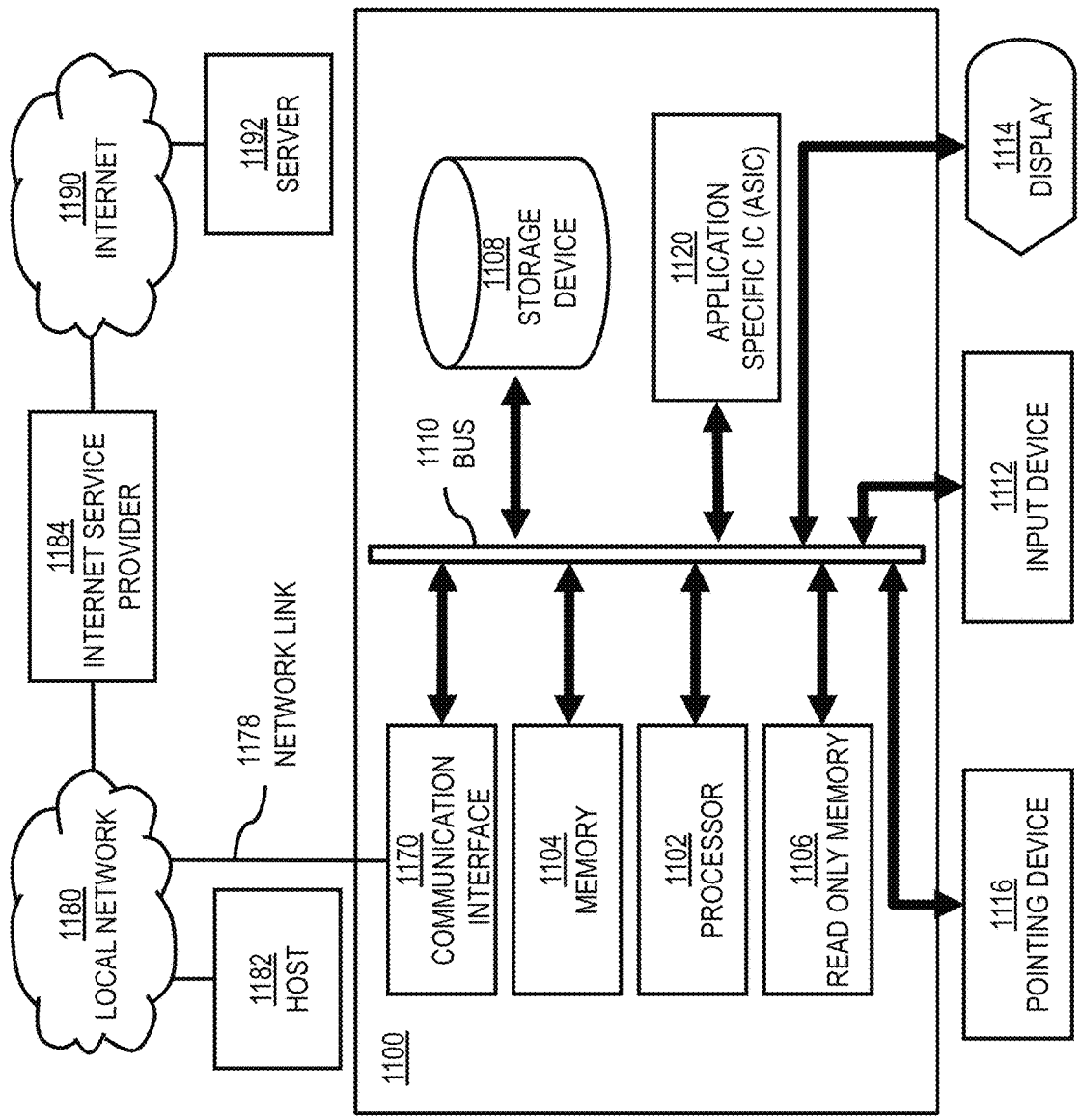
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide machine learning-based registration of imagery with different perspectives as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing machine learning-based registration of imagery with different perspectives. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RANI) or other dynamic storage device, stores information including processor instructions for providing machine learning-based registration of imagery with different perspectives. Dynamic memory allows information stored therein to be changed by the computer system 1100. RANI allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing machine learning-based registration of imagery with different perspectives, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 123 for providing machine learning-based registration of imagery with different perspectives.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide machine learning-based registration of imagery with different perspectives as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide machine learning-based registration of imagery with different perspectives. The memory 1205 also stores the data associated with or generated by the execution of the inventive steps.

Figure 13:
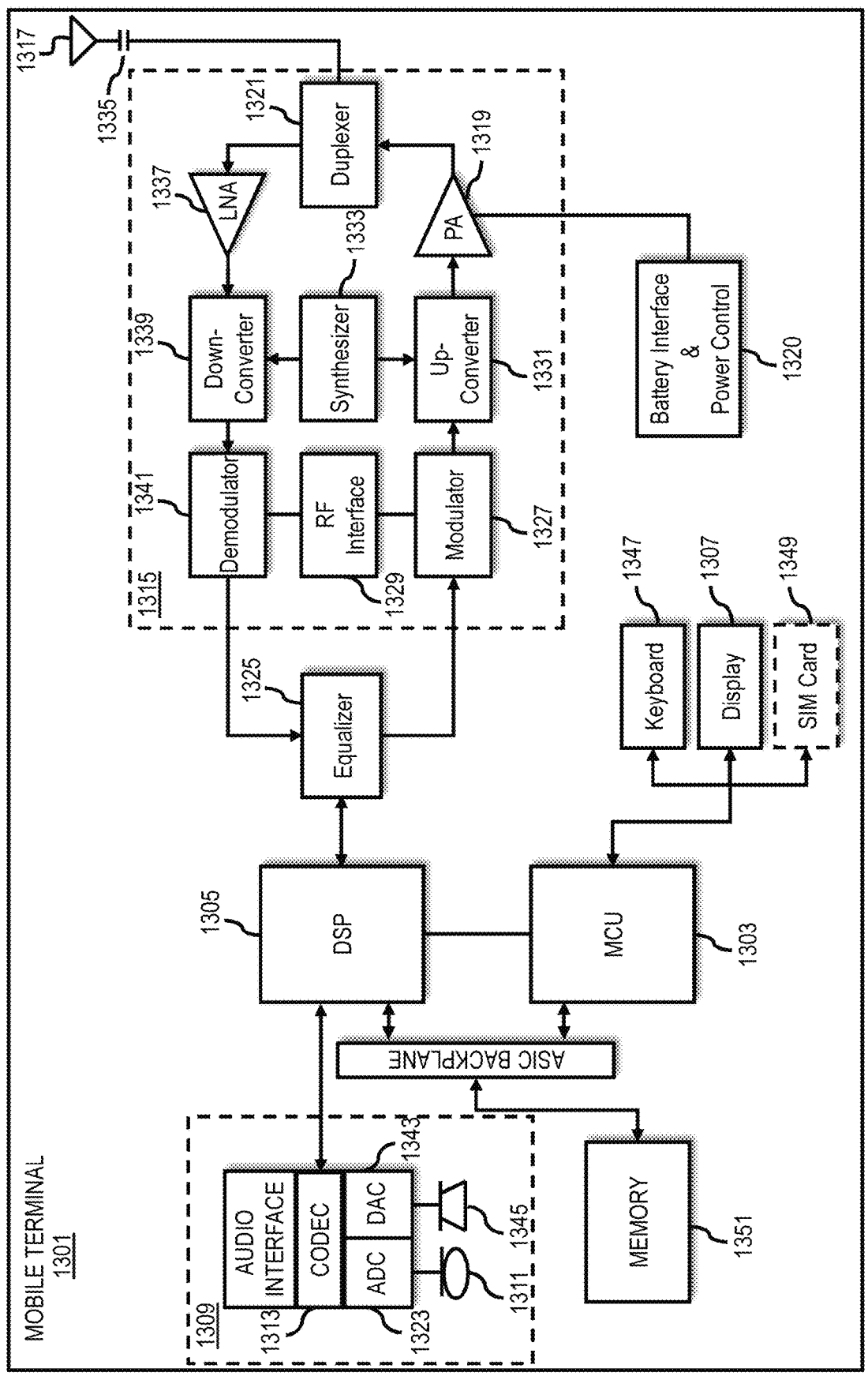
FIG. 13 is a diagram of a mobile terminal (e.g., handset, vehicle, or component thereof) that can be used to implement an embodiment.

FIG. 13 is a diagram of exemplary components of a mobile terminal 1301 (e.g., vehicle 103, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide machine learning-based registration of imagery with different perspectives. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    retrieving a first training image and a second training image, wherein the first training image depicts a geographic area from a first perspective and the second training image depicts the geographic area from a second perspective, wherein the first training image is associated with a first set of ground truth image space coordinates and the second training image is associated with a second set of ground truth image space coordinates corresponding to the one or more ground truth correspondence masks;
    initiating a labeling of one or more ground truth correspondence masks between the first training image and the second training image, wherein the one or more ground truth correspondence masks denote an image region of the first training image that matches a corresponding image region of the second training image or vice versa;
    using the one or more ground truth correspondence masks to train a machine learning model to determine one or more predicted correspondence masks between a first input image and a second input image;
    using the first set of ground truth image space coordinates and the second set of ground truth image space coordinates to further train the machine learning model to transform a first image space coordinate of the first input image to a second image space coordinate of the second input image or vice versa; and
    providing the trained machine learning model as an output to a services platform for localization of at least one of a vehicle and a user equipment device.

2. The method of claim 1, wherein the trained machine learning model that is trained to determine to one or more predicted correspondence masks is augmented with at least one extra convolutional layer, at least one extra attentional layer, at least one extra dense layer, or a combination thereof which attend to an image coordinate locality of the first input image, the second input image, or a combination thereof.

3. The method of claim 2, wherein the trained machine learning model that is trained to determine to one or more predicted correspondence masks shares one or more neural network parameter weights for transforming the first image space coordinate to the second image space coordinate.

4. The method of claim 2, wherein the first image space coordinate is specified using a local coordinate frame of reference and the second image space coordinate is specified using a global coordinate frame of reference, the method further comprising:
    using the trained machine learning model to localize the first image space coordinate in the global coordinate frame of reference.

5. The method of claim 4, further comprising:
    using the localized first image space coordinate to compute a camera position of a camera capturing the first input image, a vehicle position of a vehicle on which the camera is mounted, or a combination thereof.

6. The method of claim 1, further comprising:
    projecting image texture data associated with the one or more ground truth correspondence masks from the first training image to the second training image or vice versa;
    determining an image texture similarity metric based on the projected texture image data; and
    using the image texture similarity metric as a loss function for training the machine learning model.

7. The method of claim 1, further comprising:
    generating the first training image, the second training image, or a combination thereof by simulation, photo-realistic rendering, or a combination thereof.

8. The method of claim 1, wherein the first perspective is a street-level perspective, and wherein the second perspective is an overhead perspective.

9. The method of claim 8, wherein the trained machine learning model outputs a first correspondence mask for the street-level perspective that designates which first pixels or first regions of the first input image have a correspondence to the overhead perspective, a second correspondence mask for the overhead perspective that designates which second pixels or second regions of the second input image have a correspondence to the street-level perspective, or a combination thereof.

10. An apparatus comprising:
   at least one processor; and
   at least one memory including computer program code for one or more programs,
   the at least one memory and the computer program code configured to, with the at least one processor, cause the apparatus to perform at least the following,
      retrieve a first input image and a second input image, wherein the first input image depicts a geographic area from a first perspective and the second input image depicts the geographic area from a second perspective, wherein the first input image is associated with a first image space coordinate and the second input image is associated with a second image space coordinate corresponding to the one or more predicted correspondence masks;
      use a trained machine learning model to process the first input image and the second input image to determine one or more predicted correspondence masks between the first input image and the second input image, wherein the one or more predicted correspondence masks denote an image region of the first input image that matches a corresponding image region of the second input image or vice versa, wherein the trained machine learning model is further trained to transform the first image space coordinate to the second image space coordinate or vice versa; and
      provide the one or more predicted correspondence masks as an output to a services platform for localization of at least one of a vehicle and a user equipment device.

11. The apparatus of claim 10, wherein the first image space coordinate is specified using a local coordinate frame of reference and the second image space coordinate is specified using a global coordinate frame of reference, and wherein the apparatus is further caused to:
   use the trained machine learning model to localize the first image space coordinate in the global coordinate frame of reference.

12. The apparatus of claim 11, wherein the apparatus is further caused to:
   use the localized first image space coordinate to compute a camera position of a camera capturing the first input image, a vehicle position of a vehicle on which the camera is mounted, or a combination thereof.

13. The apparatus of claim 10, wherein the first perspective is a street-level perspective, and wherein the second perspective is an overhead perspective.

14. A non-transitory computer-readable storage medium carrying one or more sequences of one or more instructions which, when executed by one or more processors, cause an apparatus to perform:
   retrieving a first training image and a second training image, wherein the first training image depicts a geographic area from a first perspective and the second training image depicts the geographic area from a second perspective, wherein the first training image is associated with a first set of ground truth image space coordinates and the second training image is associated with a second set of ground truth image space coordinates corresponding to the one or more ground truth correspondence masks;
   initiating a labeling of one or more ground truth correspondence masks between the first training image and the second training image, wherein the one or more ground truth correspondence masks denote an image region of the first training image that matches a corresponding image region of the second training image or vice versa;
   using the one or more ground truth correspondence masks to train a machine learning model to determine one or more predicted correspondence masks between a first input image and a second input image;
   using the first set of ground truth image space coordinates and the second set of ground truth image space coordinates to further train the machine learning model to transform a first image space coordinate of the first input image to a second image space coordinate of the second input image or vice versa; and
   providing the trained machine learning model as an output to a services platform for localization of at least one of a vehicle and a user equipment device.

15. The non-transitory computer-readable storage medium of claim 14, wherein the trained machine learning model that is trained to determine to one or more predicted correspondence masks is augmented with at least one extra convolutional layer, at least one extra attentional layer, at least one extra dense layer, or a combination thereof which attend to an image coordinate locality of the first input image, the second input image, or a combination thereof.

16. The non-transitory computer-readable storage medium of claim 14, wherein the trained machine learning model that is trained to determine one or more predicted correspondence masks shares one or more neural network parameter weights for transforming the first image space coordinate to the second image space coordinate.

17. The non-transitory computer-readable storage medium of claim 14, wherein the first image space coordinate is specified using local coordinate frame of reference and the second image space coordinate is specified using a global coordinate frame of reference, and wherein the apparatus is caused to further perform:
   using the trained machine learning model to localize the first image space coordinate in the global coordinate frame of reference.

* * * * *